United States Patent [19]

Maher et al.

[11] Patent Number: 4,484,813
[45] Date of Patent: Nov. 27, 1984

[54] VACUUM PRINTER

[75] Inventors: Robert J. Maher, Auburn Heights; Ronald Tooson, Inkster, both of Mich.

[73] Assignee: Douthitt Corporation, Detroit, Mich.

[21] Appl. No.: 460,673

[22] Filed: Jan. 24, 1983

[51] Int. Cl.³ .............................................. G03B 27/20
[52] U.S. Cl. ......................................... 355/93; 355/94
[58] Field of Search .............................. 355/61, 91–94, 355/73; 248/363

[56] References Cited

U.S. PATENT DOCUMENTS

| | | | |
|---|---|---|---|
| 2,270,578 | 1/1942 | Cambell | 355/94 |
| 2,287,228 | 6/1942 | Cambell | 355/93 |
| 2,376,416 | 5/1945 | Cambell | 355/61 |
| 2,494,282 | 1/1950 | Cambell | 355/93 |
| 3,106,145 | 10/1963 | Hutchins | 355/93 |
| 3,995,955 | 12/1976 | Töpfer | 355/91 |

FOREIGN PATENT DOCUMENTS 2230111  1/1973  Fed. Rep. of Germany ........ 355/91

Primary Examiner—Richard A. Wintercorn
Attorney, Agent, or Firm—Cullen, Sloman, Cantor, Grauer, Scott & Rutherford

[57] ABSTRACT

In a vacuum printer for the graphic arts having a bed, a blanket frame upon the bed including a flexible impervious blanket having a peripheral sealing bead, a glass frame juxtaposed over the blanket frame in snug registry with the blanket bead defining a contact printing chamber, the glass frame being movably mounted for opening and closing movements relative to the blanket frame, a vacuum source having a first vacuum conduit extending into communication with the printing chamber for evacuating it; the improvement which comprises a perforated blanket support plate within the blanket frame underlying the blanket and defining within the blanket frame a blanket chamber. A second vacuum conduit interconnects the vacuum source and the blanket chamber. An electronic control is connected to the conduits for evacuating the blanket chamber, and after a pre-set period evacuating the printing chamber. In the method of contact printing wherein the step of communicating vacuum to a vacuum printing chamber between a glass frame and a flexible blanket is preceded by the step of communicating vacuum to a blanket chamber below the blanket for a predetermined interval holding the blanket away from the glass frame until the vacuum printing chamber is fully evacuated.

6 Claims, 4 Drawing Figures

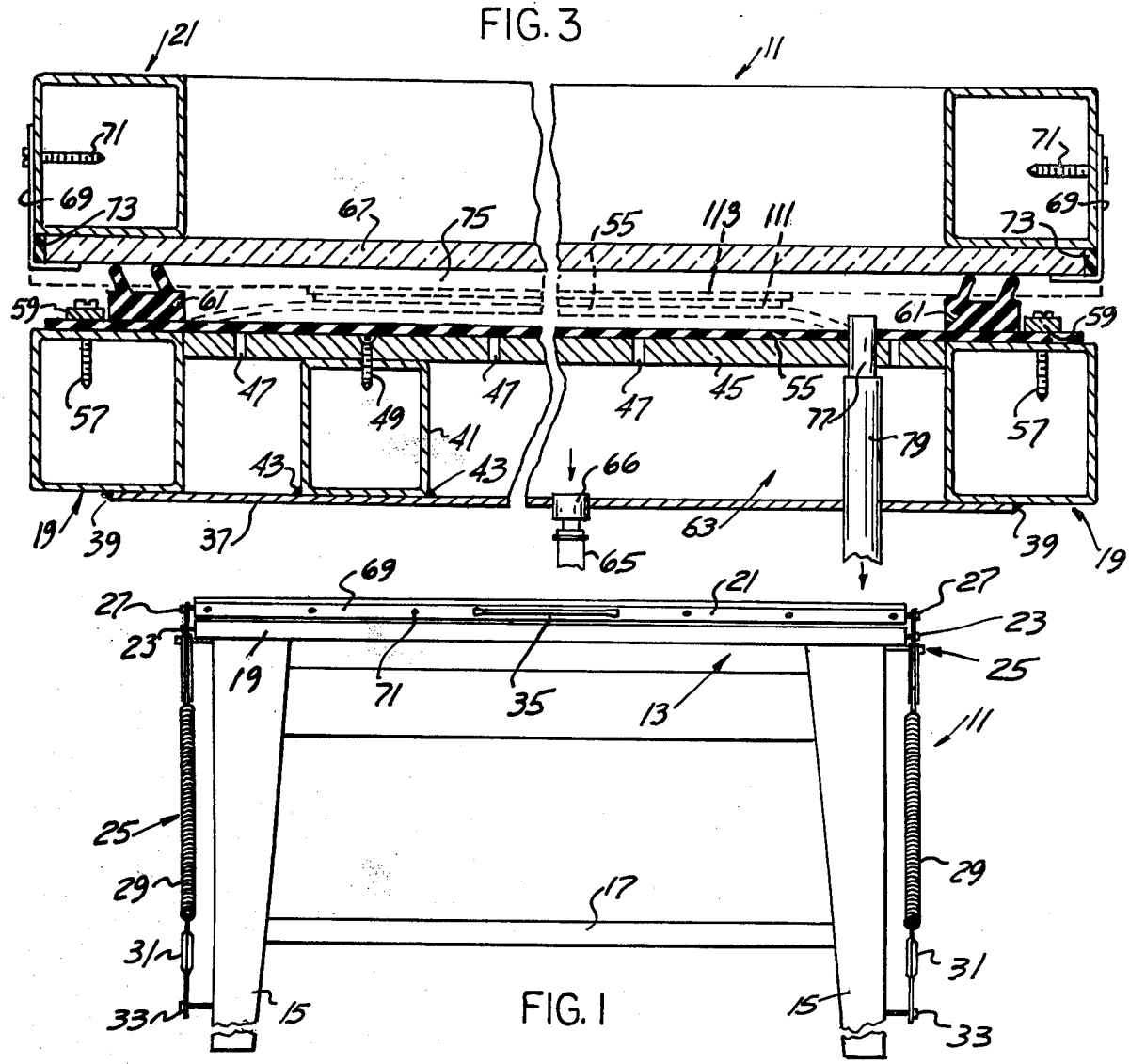
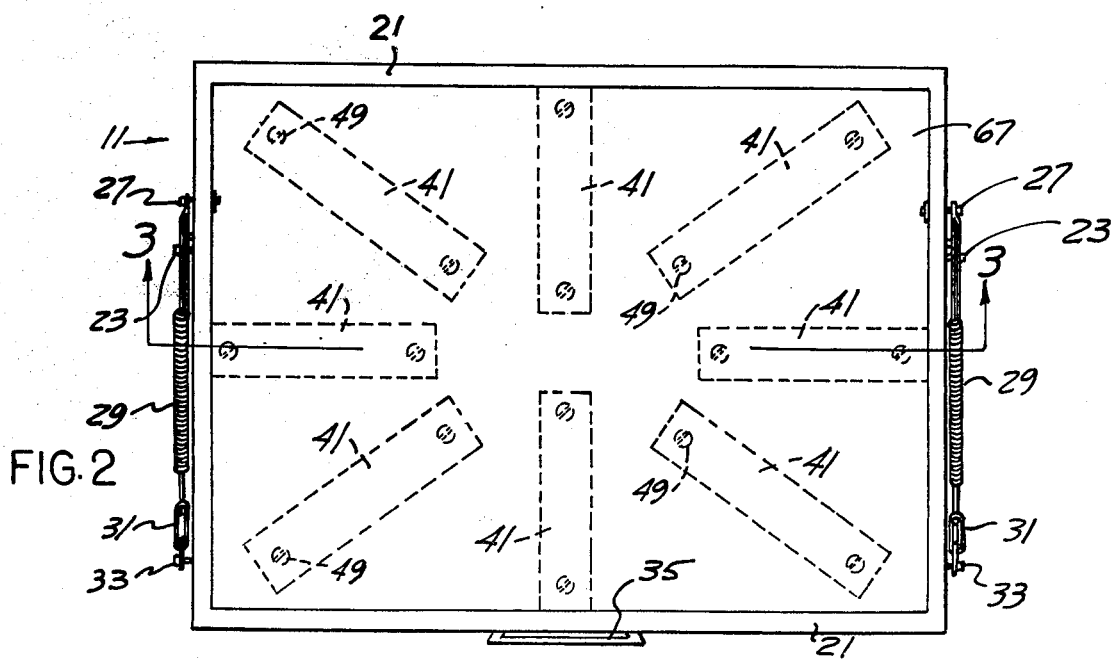

VACUUM PRINTER

BACKGROUND OF THE INVENTION

Vacuum contact printing for the graphic arts is well known and wherein upon a bed there is normally mounted in a horizontal position a blanket frame which includes a flexible impervious blanket having a peripheral bead. A glass frame is positioned above the blanket frame and adapted for snug registry with its bead for defining a contact printing chamber between the glass frame and blanket. Hinges interconnect the glass frame with the blanket frame so that the glass frame may be pivoted or otherwise elevated with respect to the blanket frame in order to permit loading upon the blanket of a light sensitive sheet and thereover a negative. A vacuum source is provided having a conduit for providing vacuum communication to the printing chamber. After a predetermined period the flexible blanket of the blanket frame is drawn tightly and snugly up against the glass of the glass frame after which a light is presented to the frame assembly either in a horizontal or vertical position for exposing the sensitized sheet or plate. Examples of that type of vacuum printer are shown in the following United States prior art patents:

| U.S. Pat. No. | DATE | NAME |
| --- | --- | --- |
| 2,287,228 | June 23, 1942 | J. T. Campbell |
| 2,376,416 | May 22, 1945 | J. T. Campbell |
| 2,494,282 | January 10, 1950 | J. T. Campbell |
| 2,270,578 | January 20, 1942 | J. T. Campbell |
| 3,106,145 | October 8, 1963 | L. Hutchins |

Most of the foregoing patents show the relationship between a flexible blanket within a blanket frame and the glass of the overlying glass frame wherein the chamber between the two frames, sometimes referred to as a vacuum printing chamber, is evacuated so as to establish a good contact between the negative and the sensitized sheet and the glass frame at the time that it is exposed by the momentary application of the source of light.

The problem has heretofore existed that though every effort is made to completely evacuate the vacuum chamber to establish a snug contact between the flexible blanket and the glass of the glass frame, it appears that though not intended in many cases, the initial application of vacuum to the vacuum chamber moves such portions of the blanket with respect to the glass of the glass frame that air is actually entrapped within the vacuum chamber, preventing perfect contact. This occured because the vacuum started at the perimeter of the frames and moved toward the center.

This is productive of exposed negatives which are not one hundred percent effective due to a lack of a perfect contact between the glass and blanket and the negative and sensitized sheet therebetween.

In the prior art patents as practiced considerable difficulty has been encountered in attempting to obtain a complete evacuation of all of the air between the glass and blanket frames hopefully to obtain perfect exposure photographically on to the sensitized sheet. Efforts have been made to provide a more complete evacuation of the vacuum printing chamber.

SUMMARY OF THE INVENTION

It is an important feature of the present invention to provide an improved vacuum printer for the graphic arts and wherein a mechanism is employed which will assure and achieve a perfect vacuum condition between the glass frame and blanket frame and wherein all of the air therebetween has been withdrawn.

A further feature is to provide an improved method and apparatus by which for an initial period, the flexible blanket is withdrawn or held away from the glass frame until such time as substantially all of the air has been withdrawn from the printing chamber between the two frames. Here the vacuum starts at the center of the frames and migrates outwardly. This is a reverse of the prior art devices.

It is a further feature to provide an improved blanket frame which incorporates a perforated blanket support arranged upon one side of the blanket defining a blanket chamber, sometimes referred to as a vacuum blanket chamber.

A further feature incorporates the use with a vacuum source normally used for application to the vacuum printing chamber of a second conduit communicating vacuum to the blanket chamber below the flexible blanket for a predetermined interval and thereafter and while the blanket is still withdrawn from the glass frame provide communication of vacuum from the vacuum source to the printing chamber between the blanket and glass frame. The subsequent release of vacuum from the blanket chamber assures that all air is withdrawn from the printing chamber.

A further feature of the present invention is directed to the method of contact printing wherein the step of communicating vacuum to a vacuum printing chamber between the glass frame and a flexible blanket is preceded by the step of communicating vacuum to a vacuum chamber below the blanket for a predetermined interval holding the blanket away from the glass of the glass frame until the vacuum printing chamber is fully evacuated.

These and other features and objects will be seen from the following Specification and claims in conjunction with the appended drawings.

THE DRAWINGS

FIG. 1 is a front elevational view of the present vacuum printer.

FIG. 2 is a plan view thereof.

FIG. 3 is a fragmentary vertical section taken in the direction of arrows 3—3 of FIG. 2, on an increased scale.

DETAILED DESCRIPTION OF AN EMBODIMENT OF THE INVENTION

THE PRIOR ART

Figure 4:
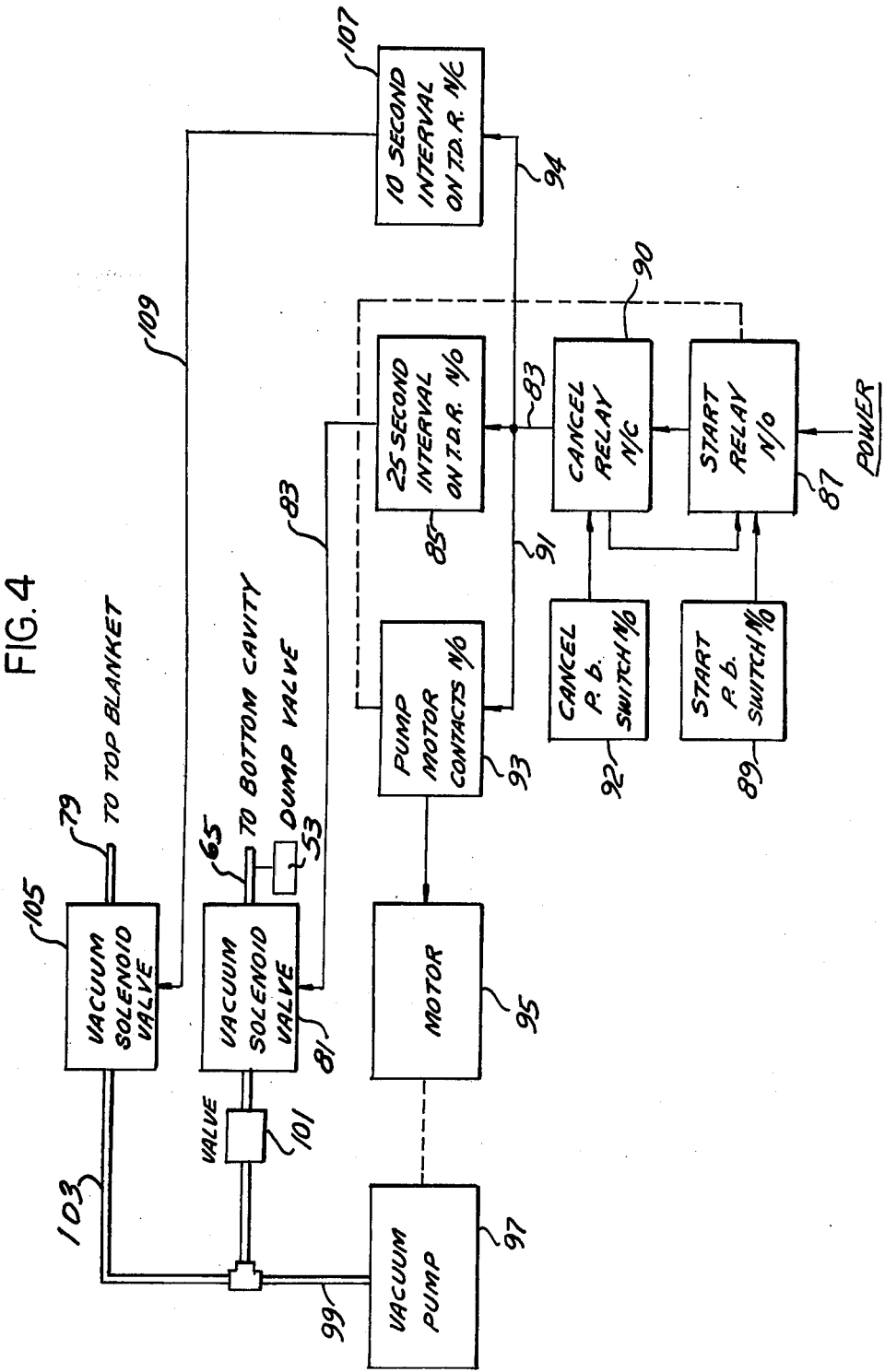
FIG. 4 is a schematic block diagram of the pneumatic and electrical circuit for the present vacuum printer.

Referring to the drawings in FIGS. 1, 2 and 3, there is shown a vacuum printer 11, sometimes referred to as a vacuum contact printer particularly useful in the graphic arts, including a bed 13 having legs 15 and a reinforcing horizontal platform 17.

Overlying and suitably secured to the bed is a horizontally disposed blanket frame 19, shown in cross section and on an increased scale in FIG. 3. The blanket frame is of continuous tubular construction as shown at 19. Overlying and juxtaposed over the blanket frame is a similarly shaped generally rectangular glass frame 21.

In normal operation the glass frame 21 is directly positioned over the blanket frame 19 such as shown in FIG. 3 and is adapted for movement towards and away from the blanket frame. In the illustrative embodiment, the glass frame 21 is pivotally mounted at its opposite ends at a central portion to corresponding central portions of the blanket frame 19, FIGS. 1 and 2. Sometimes the glass frame is mounted for vertical movements relative to the blanket frame.

The pivotal mounting for the glass frame includes a pair of outwardly directed hinges or pivots 23 upon opposite ends of the blanket frame centrally thereof which receive opposed toggle linkages 25 pivotally connected to the overlying glass frame at 27 and with the springs 29 yieldably connected through the turn buckle 31 to the anchors 33 attached to legs 15. Handle 35 projects from one side of the glass frame to facilitate upward tilting of the glass frame with respect to the blanket frame for a distance approximately 90°, for example, for loading and unloading.

The foregoing construction is a conventional construction characteristic of prior art vacuum contact printers. The present improved vacuum printer includes an improved and modified blanket frame 19 which includes lower enclosure plate 37 which spans the tubular framework 19 of the blanket frame and is suitably secured thereto as by the continuous welds 39.

A plurality of circularly spaced radial tubes 41 in a sunburst configuration of square cross-section, one of which is shown in FIG. 3, and shown in dash lines, FIG. 2 are mounted upon plate 37 and suitably secured thereto as by the welds 43. Blanket support plate 45 is perforated throughout, defining a series of vacuum ports 47. Plate 45 is positioned within the upper portion of blanket frame 19 and is mounted upon the series of tubes 41 and secured thereto by a plurality of fasteners 49.

Perforated blanket support plate 45 is supported and secured upon reinforcement tubes 41. The top surface of the blanket support plate 45 closely adjacent the top surface of the blanket frame 19, FIG. 3. It may be slightly above frame 19.

A flexible blanket 55 constructed of rubber or neoprene or a laminate of rubber and canvas, for illustration, generally overlies the blanket frame 19 and is secured thereto by a series of peripheral fasteners 57 threaded down into the blanket frame with anchor strips 59 interposed.

Inwardly of the fasteners 57, there is provided a continuous peripheral blanket beading 61 adhered by cement or otherwise to the top surface of flexible blanket 55, FIG. 3.

In assembly of the glass frame 21 and its glass 67 in engagement with the peripheral bead 61, there is defined a conventional vacuum printing chamber 75 known in the art.

Forming a part of the glass frame 21 and underlying the tubular frame portion thereof is a clear glass 67 which extends across the bottom of the glass frame and is mounted thereunder by the continuous angle support peripheral angle bracket 69 secured to the glass frame 21 as by a series of fasteners 71. A packing gasket 73 is mounted within the angle brackets 69 and peripherally engages glass 67 throughout 360°.

Formed within the blanket frame 19 and interposed between the perforated blanket support plate 45 and lower enclosure plate 37 is a second vacuum chamber, sometimes referred to as blanket chamber 63.

A vacuum fitting 77 extends through flexible blanket 55 and blanket support 45 and projects into the blanket chamber and has suitably clamped thereon the vacuum hose or conduit 79, sometimes referred to as a second vacuum pipe. The hose 79 extends through a portion of bottom plate 37 of the blanket chamber and is adapted for connection to the solenoid controlled vacuum valve 105 shown in FIG. 4.

Referring to FIG. 3, projected through the enclosure plate 37 is a fitting 66 suitably anchored thereto with its inner end in communication with blanket chamber 63. The other end of the fitting on the outside of the blanket frame has clamped thereon the first vacuum tube 65 which extends to the solenoid controlled vacuum valve 81, FIG. 4.

FIG. 4 is a block diagram or schematic view showing the pneumatic and electrical connections for the present vacuum printer. The vacuum source defined herein includes vacuum pump 97 driven by a motor 95 having a vacuum conduit 99 which extends through the restricting valve 101 to the normally closed solenoid control vacuum valve 81 having an inlet pipe 65 corresponding to hose 65 shown in FIG. 3 for providing communication to the bottom or blanket chamber 63.

The electrical connections include a normally open start push button switch 89 connected to the normally open start relay 87 connected to a suitable electrical power source.

Normally open start relay is adapted to latching onto the normally closed cancel relay 90 and through the lead 83 in the electrical circuit connects to interval timer 85. Said timer is normally open for controlling solenoid control vacuum valve 81. There is provided a normally open cancel push button switch 92 which is connected to the normally closed cancel relay 90 for turning off the cycle at any time and unlatching the start relay 87.

Lead 91 branch is connected to the pump motor contacts 93 which are normally open for energizing motor 95 and the connected vacuum pump 97.

Branch lead wire 94 is connected to the second normally closed interval timer 107, which through lead 109 is connected to the second solenoid control vacuum valve 105. This controls communication of vacuum through the conduit 79 to printing chamber 75. Branch conduit 103 connects vacuum conduit 99 to the solenoid controlled valve 105.

On start of the cycle the start PB switch 89 is pushed causing start relay 87 to latch on via the normally closed cancel relay 90 for supplying power through the leads 83, 91 to pump motor contacts 93 and to the two time delay relays or timers 85 and 107.

Power is passed from the normally open relay 85 for 25 seconds, for illustration, for opening the solenoid control vacuum valve 81 for evacuating the blanket chamber 63 through conduit 65. In the illustrative embodiment, timer 85 remains closed for 25 seconds evacuating blanket chamber 63.

The normally closed relay timer switch 107 initially opens for 10 seconds in the illustrative embodiment, then closes for delivering electrical power to the solenoid control valve 105 for establishing vacuum communication through conduit 79 to printing chamber 75.

Vacuum solenoid 105 stays energized until cancelling of the cycle using the cancel PB switch 92, which breaks the latching line shown in the diagram.

The primary objective is that for an initial preset period, vacuum is communicated only to the blanket chamber 63 below the perforated blanket support 45 for a predetermined interval such as 25 seconds. During this period, the vacuum condition within the chamber 63 retains the blanket 55 snugly against the top surface of support plate 45.

After a 10 second delay for illustration, the solenoid control vacuum valve 105 is activated permitting the application of vacuum through the conduit 79 to the vacuum printing chamber 75. At this time, with the blanket 55 retained against its support plate, it is practical and effective for vacuum communication to the printing chamber 75 to be one hundred percent effective in removing all of the air therefrom. At the end of the preset period, the vacuum control valve 81 is deactivated to the blanket chamber 63 and the blanket 55 is free to snugly engage the undersurface of the glass 67 of the glass frame 21. The printing materials are snugly interposed therebetween in very effective contact printing relationship for light exposure in a conventional manner.

Vacuum dump valve 53, FIG. 4 is connected to vacuum conduit 65. When the valve 81 is energized, the dump valve is closed. When valve 81 is deactivated, the dump valve 53 automatically opens to clear vacuum from the blanket chamber 63.

As shown in FIG. 3, in an actual use position, the glass 67 has moved downwardly towards the blanket 55 to the dash lines shown wherein the peripheral fingers on the beading 61 are substantially collapsed for effectively sealing vacuum chamber 75. The vacuum is applied only to the printing chamber 75 as above described. The blanket 55 is flexed upwardly from its support 45 as shown in dash lines against the glass 67 shown in the dash line position. However, there is interposed snugly between the glass and the blanket the bottom sensitized sheet 111 there above a negative or a drawing 113 to be reproduced. The blanket 55 in its use position within chamber 75 is thus flexed upwardly as shown in dash lines, FIG. 3.

By this construction and method there is the assurance that before the printing chamber 75 is fully evacuated, the flexible blanket is held or retained against movement towards the glass for a limited period. Thereafter vacuum is applied to the printing chamber so that all of the air in the printing chamber is removed before the blanket 55 is released for snug engagement with the undersurface of glass 67.

While in the prior art types of constructions above described with vacuum only applied to a vacuum printing chamber, air has been retained and trapped within the vacuum printing chamber which is undesirable because it prevents perfect contact and good photographic exposure.

By the present construction and by the present method and the preliminary step of evacuating the blanket chamber first, there is an assurance that during the initial period of evacuation of the vacuum printing chamber 75 that the blanket will be retained away from contact with the glass such as not to trap air in the vacuum chamber. On the other hand, to assure that all air is withdrawn the blanket 55 is sufficiently flexible so as to be in substantial surface contact with the glass of the frame and with the printing materials interposed. In the illustration shown in FIG. 3, there is an exaggeration of the spacing between the glass 67 and blanket 55. For printing, the glass is in a lower dash line position partly collapsing the beading 61.

The primary objective achieved by the present construction and method is the assurance that all of the air within the printing chamber 75 is removed between the blanket and glass for highly efficient and perfect photographic contact printing.

A further objective assures that the functioning of the initially operative blanket chamber 63 is such as to initially retain the flexible blanket away from the glass of the glass frame to assure that no air is entrapped within the vacuum printing chamber 75. Thus, it is assured that there is a perfect vacuum between the glass and the blanket such as will provide for highly acceptable prints overcoming difficulties in the past due to the fact that air heretofore had actually been retained trapped within the printing chamber.

The present invention is further directed to the method of contact printing wherein the step of communicating vacuum to the vacuum printing chamber between the glass frame and the flexible blanket of the blanket frame is preceded by the step of communicating vacuum to a blanket chamber below the blanket for a predetermined interval holding the blanket away from the glass frame until the vacuum printing chamber is fully evacuated.

Having described our invention, reference should now be had to the following claims.

We claim:

1. In a vacuum printer for the graphic arts, having a bed, a blanket frame upon said bed including a flexible impervious blanket having a peripheral sealing bead, a glass frame juxtaposed over the blanket frame in snug registry with said bead, defining a contact printing chamber, means movably mounting the glass frame for opening and closing movements relative to said blanket frame, a vacuum source having a first vacuum conduit extending into communication with said printing chamber for evacuating said chamber;

the improvement comprising a perforated blanket support plate within said blanket frame underlying said blanket and defining within said blanket frame a blanket chamber;

a second vacuum conduit interconnecting said vacuum source and said blanket chamber;

and a control means connected to said conduits for evacuating said blanket chamber, and after a preset period evacuating said printing chamber;

said vacuum source including an electric motor operated vacuum pump outletting to said conduits;

said control means including first and second solenoid control valves in said conduits respectively;

said control means further including an electronic power circuit to said valves and a pair of selectively operable timers connected to each valve.

2. In the vacuum printer of claim 1, one timer being preset to close one valve after a predetermined time interval for the initial evacuating of said blanket chamber;

the other timer being preset to open the other valve after a predetermined time interval thereby assuring that the blanket is retained upon its support during the initial evacuating of said printing chamber.

3. In the vacuum printer of claim 1, said control means being preset so that after evacuating said blanket chamber holding the blanket away from said glass frame, and successively during such evacuation, the printing chamber is evacuated preventing air entrappment therein.

4. In the vacuum printer of claim 2, a vacuum dump valve connected to said blanket chamber and adapted to open automatically when the vacuum control valve for said blanket chamber is deactivated.

5. In a vacuum printer for the graphic arts, having a bed, a blanket frame upon said bed including a flexible impervious blanket having a peripheral sealing bead, a glass frame juxtaposed over the blanket frame in snug registry with said bead, defining a contact printing chamber, means movably mounting the glass frame for opening and closing movements relative to said blanket frame, a vacuum source having a first vacuum conduit extending into communication with said printing chamber for evacuating said chamber;

the improvement comprising a blanket support plate within said blanket frame having a plurality of vacuum passages therethrough underlying said blanket and defining within said blanket frame a blanket chamber;

a second vacuum conduit interconnecting said vacuum source and said blanket chamber;

and a control means connected to said conduits for evacuating said blanket chamber, and after a preset period evacuating said printing chamber;

said vacuum source including an electric motor operated vacuum pump outletting to said conduits;

said control means including first and second solenoid control valves in said conduits respectively.

6. In a vacuum printer for the graphic arts, having a bed, a blanket frame upon said bed including a flexible impervious blanket having a peripheral sealing bead, a glass frame juxtaposed over the blanket frame in snug registry with said bead, defining a contact printing chamber, means movably mounting the glass frame for opening and closing movements relative to said blanket frame, a vacuum source having a first vacuum conduit extending into communication with said printing chamber for evacuating said chamber;

the improvement comprising a perforated blanket support plate within said blanket frame underlying said blanket and defining within said blanket frame a blanket chamber;

a second vacuum conduit interconnecting said vacuum source and said blanket chamber;

and a control means connected to said conduits for evacuating said blanket chamber, and after a preset period evacuating said printing chamber;

said blanket frame including a lower enclosure plate spaced from said blanket support plate, as the bottom boundary of said blanket chamber;

a plurality of spaced angularly related reinforcement tubes, of square cross-section, interposed between said support plate and lower enclosure plate and secured thereto.

* * * * *